United States Patent [19]
Hampton et al.

[11] 3,810,365
[45] May 14, 1974

[54] METHOD OF DISTRIBUTING CARBON DIOXIDE

[75] Inventors: Robert S. Hampton, Livermore; Paul J. Eifel, Walnut Creek, both of Calif.

[73] Assignee: Lox Equipment Company, Livermore, Calif.

[22] Filed: June 12, 1972

[21] Appl. No.: 261,601

[52] U.S. Cl. .................................. 62/48, 62/165
[51] Int. Cl. ............................................ F17c 11/00
[58] Field of Search ............ 62/1, 10, 12, 46, 514, 62/384, 165, 166, 167, 168

[56] References Cited
UNITED STATES PATENTS

| | | | |
|---|---|---|---|
| 3,306,057 | 2/1967 | Harmens | 62/12 |
| 2,951,351 | 9/1960 | Snelling | 62/12 X |
| 1,969,169 | 8/1934 | Eichmann | 62/10 |
| 3,395,546 | 8/1968 | Sherlock et al. | 62/10 |
| 3,001,374 | 9/1961 | Hutton, Jr. | 62/50 |

*Primary Examiner*—Meyer Perlin
*Assistant Examiner*—Ronald C. Capossela
*Attorney, Agent, or Firm*—Joseph B. Gardner

[57] ABSTRACT

A system for producing, storing and distributing carbon dioxide as a multi-phasic product at triple-point temperature and pressure conditions. The system constitutes a method of storing and transporting carbon dioxide as a multi-phasic admixture of liquid and solid fractions in proportions enabling the carbon dioxide mass to be processed as a pumpable liquid or semiliquid; and steps of the method include providing the multi-phasic admixture, and confining the same within a container therefor after which the confined mass may be transported to a remote destination while being maintained in multi-phasic condition. In producing the admixture, liquid carbon dioxide is expanded toward the triple-point pressure while removing vapor to control the ratio of solids formation.

29 Claims, 3 Drawing Figures

PATENTED MAY 14 1974　　3,810,365
FIG. 1
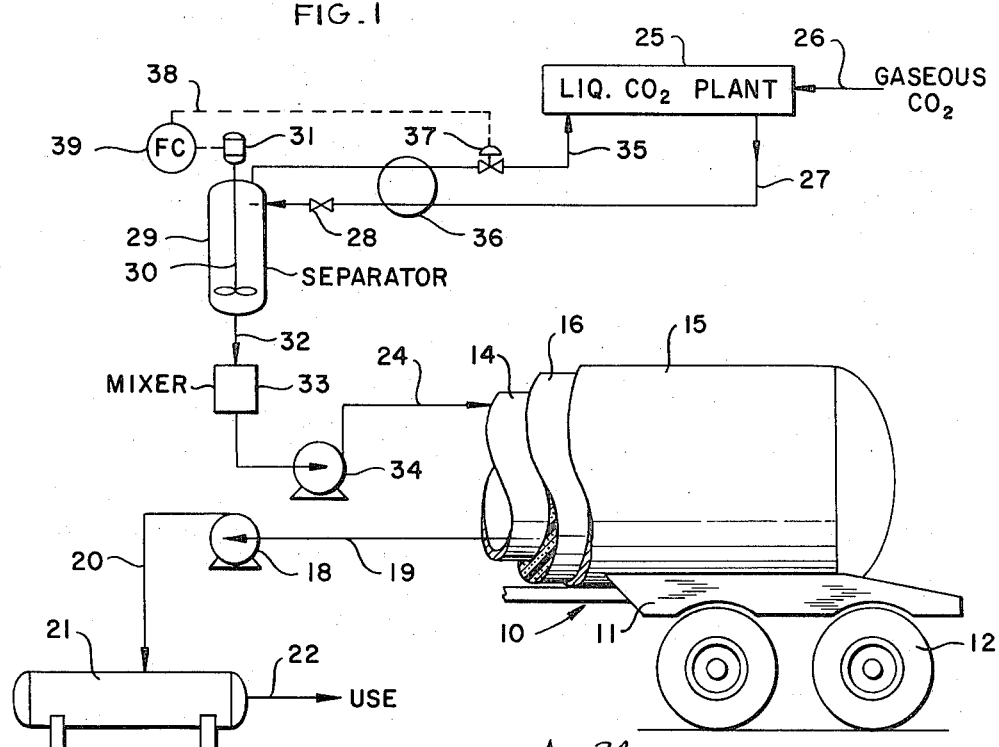
FIG. 3
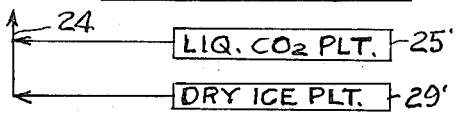
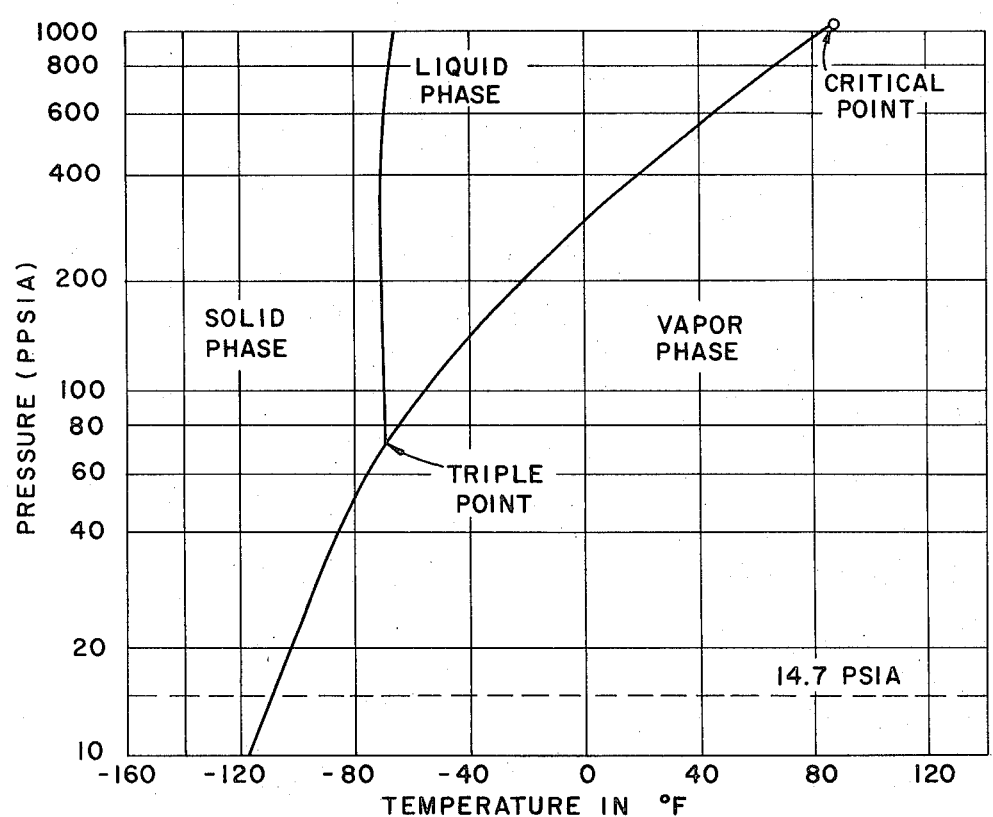
FIG. 2

METHOD OF DISTRIBUTING CARBON DIOXIDE

This invention relates to distribution of fluids and similar materials at reduced temperatures and elevated pressures and, more particularly, to a method of and apparatus for producing, storing, and distributing carbon dioxide as a multi-phasic product comprising an admixture of liquid and solids.

Since its inception in the United States in the late 1800's, the carbon dioxide industry has experienced, especially in recent years, a tremendous increase both in the amount of carbon dioxide used and in the nature of its uses. At present, a total of over a billion and a half pounds of liquid carbon dioxide are used each year, and a very substantial portion of this total is used as a refrigerant. Accordingly, the value of such portion of the carbon dioxide product is a direct function of the refrigeration capacity or cold content thereof (the term "cold content" being used herein to describe the property or ability of the product to absorb heat at temperatures below ambient temperatures as by virtue of the heat of fusion, latent heat of vaporization, and sensible heat of either a liquid or gas having a temperature below that of the ambiment environment).

The large demand for carbon dioxide as a refrigerant has led to the development of a presently used distribution system in which carbon dioxide, which is produced as a gas, is converted into its liquid phase and is transported and stored essentially as a liquid at temperatures generally of from about −20° to +4° F. and at equivalent pressures in the range of about 200 psia to 300 psia. Liquid carbon dioxide maintained at these temperatures and pressures is shipped in bulk quantities in large tank cars and vehicles that are necessarily heavily insulated to maintain the temperature of the liquid within the range noted. At their destinations, such tanks or transport vessels may be unloaded into permanent storage facilities that are also well insulated and are usually arranged with mechanical refrigeration equipment.

The relatively high storage and transport pressures of from 200 psia to 300 psia necessitate the use of relatively thick walled containers or vessels having sufficient structural strength to accommodate working pressures of this magnitude; and by way of example, a typical tank car used to transport liquid carbon dioxide may have an unloaded weight of from 100,000 to 110,000 pounds with the inner fluid-receiving or pressure container having steel walls of the order of 1 inch in thickness. A tank car of this size can accommodate approximately 18,000 gallons of liquid carbon dioxide.

Although carbon dioxide exists in gaseous phase at atmospheric temperature and pressure conditions, it can also exist in both liquid and solid phases, and the triple-point of carbon dioxide at which all three phases can coexist is −69.9° F. at a pressure of 75.1 psia. As respects refrigeration capacity, solid carbon dioxide is preferable to both liquid and gaseous carbon dioxide and has generally about twice the refrigeration capacity of liquid carbon dioxide (at a pressure of 300 psia) on a pound-for-pound basis. Gaseous carbon dioxide has little value as a refrigerant. In more specific terms, the cold content or refrigeration capacity of solid carbon dioxide exceeds that of liquid carbon dioxide by the amount of the latent heat of fusion, or about 84 BTU's per pound at triple-point conditions.

The main difficulty in the utilization of solid carbon dioxide as a refrigerant is encountered in transporting and otherwise handling the same; and to a very considerable extent, the greater ease with which liquid carbon dioxide can be transported and handled has resulted in its use preponderating over that of solid carbon dioxide irrespective of the superior qualities of the latter as a refrigerant.

As concerns the present invention, a general object thereof is to provide an improved system for distributing, handling, and otherwise processing carbon dioxide especially for use thereof as a refrigerant. Another object of the invention is in the provision of an improved system of the character described which combines the superior refrigeration capacity or cold content of solid carbon dioxide and the superior handling characteristics of liquid carbon dioxide.

Still another object is that of providing an improved method of the type described in which carbon dioxide is provided and distributed as a multi-phasic product at triple-point pressure and temperature conditions and exists essentially as an admixture of liquid and solids or "slush" in proportions enabling it to be handled as a pumpable product or mass.

Further objects, among others, of the invention are to provide an improved system and method as previously explained which is compatible with existing carbon dioxide distribution systems and functions to increase the storage capacity thereof; which reduces the bulk and weight required for storage and transport vessels, thereby enabling more product to be transported by vehicles therefor whether road, rail, air or other vehicular transport; which permits longer term product storage without refrigeration, and can eliminate or reduce the requirement for refrigeration equipment; which increases the available refrigeration capacity of the transfer medium; and which reduces the capital expediture for equipment.

Additional objects and advantages of the invention, especially as concerns particular features and characteristics thereof, will become apparent as the specification continues.

An exemplary embodiment of the invention is illustrated in the accompanying drawings, in which:

FIG. 1 is a schematic diagram of a distribution system embodying the invention;

FIG. 2 is the equilibrium curve for carbon dioxide;

FIG. 3 is a partial schematic diagram for a slightly modified system.

Depicted in FIG. 1 in diagrammatic form is a container structure or vessel 10 intended for use with fluids that are necessarily stored and transported at relatively low temperatures. In more particular terms, the vessel 10 is intended for use in storing, transporting, and otherwise handling carbon dioxide at or near the triple-point temperature and pressure conditions thereof: namely, −69.9° F and 75.1 psia, respectively. The vessel 10 may be used either for stationary storage or for mobile storage and transport (including highway, railway, air, and other transport), and in the form shown, it is intended for highway transport and is supported upon a chassis 11 equipped with a plurality of wheels 12 that enable it to be rollingly transported by any suitable truck tractor in a completely conventional manner, all as is well known in the art. Although the size and capacity of any particular vessel 10 may vary considerably, by way of indicating a general order of magnitude of typical vessels, the overall length of one wheel-equipped vessel intended to transport approximately 6,000 gallons of carbon dioxide in a multiphasic state is about 40 feet and the outer diameter thereof is about 8.0 feet.

The vessel 10 includes a plurality of axially elongated containers disposed one within another in substantially concentric relation although coaxiality is not a requisite. In the usual case, however, such containers will be coaxially related one to the other in radially spaced relation, as illustrated in FIG. 1. The vessel 10 shown includes a first or inner storage container 14 adapted to receive and store carbon dioxide therewithin, and it further includes an outer container or jacket 15 completely enclosing the inner container. Details concerning the filler and discharge systems associated with the container 14 have been omitted, being depicted diagrammatically because they can be relatively simple and common place, and for purposes of the present invention any suitable and essentially conventional system may be employed.

The inner container 14 may have standard structural characteristics and can be fabricated, for example, from nickel-alloy steel, although other materials can be used. The inner container 14 is also supported within the outer container 15 by means permitting relative expansions and contractions therebetween adjacent at least one end of the inner container as explained, for example, in the commonly assigned copending patent application of Paul J. Eifel and Cesar E. Cavanna, Ser. No. 105,413 filed Jan. 11, 1971 now U.S. Pat. No. 3,696,959. The outer container 15 is typically constructed of carbon steel and is secured to the chassis 11 in any generally suitable and ordinary manner.

The space defined between the inner and outer containers 14 and 15 is arranged to provide a heat barrier minimizing migration of ambient heat inwardly from the outer container to the inner container because any inward heat transfer tends undesirably to elevate the heat content of the carbon dioxide materials confined within the inner container. As respects the present invention, any conventional arrangement may be employed to insulate thermally one container from another, and usually the space between the two containers is filled with one of the very effective modern insulations such as foam polyurethane and other plastic foams, fiberglass, cork, etc. In the drawing, a mass or body of thermal insulation 16 is shown in FIG. 1 within the space intermediate the containers 14 and 15.

Since no thermal insulation interposed between the containers 14 and 15 can provide a perfect temperature barrier, the carbon dioxide within the inner container 14 will experience some increase in its heat content, especially as the length of its storage time increases and also during transport over long distances because of conversion into heat of kinetic energy imparted to the carbon dioxide as a consequence of vibration, changes in velocity of the transport vehicle, and so forth. Such increases in the heat content of the carbon dioxide will not, for a considerable length of time, significantly change the multi-phasic condition thereof because the heat is used by the material to convert sufficient quantities of solid carbon dioxide into liquid to maintain the approximate triple-point temperature and pressure conditions within the inner container. Following conversion of all of the solid carbon dioxide into a liquid phase, further increases in the heat content change portions of the liquid into a gas which must then be permitted to escape in order to maintain the requisite low working pressure within the container 14 which in specially constructed equipment will be slightly in excess of the triple-point pressure of the order of 75 psia.

As is well known, various pressure relief valves and other safety devices (neither of which are shown) are required on vessels of the type being considered, especially those coming within the jurisdiction of the Federal Interstate Commerce Commission and similar regulatory agencies, and the vessel 10 may be provided with all mandatory equipment of this character including valve structure permitting escape of carbon dioxide gas as necessary to maintain the pressure within the container 14 below the maximum permissible working pressure thereof.

The vessel 10 necessarily has a discharge system to enable the carbon dioxide mass stored within the container 14 to be removed therefrom either for direct use at the point of destination or, more usually, for storage in facilities provided for this purpose and within which the product is maintained prior to final consumption. In either instance standard procedure and equipment may be used including a pressure-building coil (not shown), and such procedures are exemplified by a pump 18 that is driven in any conventional manner, electrically in the customary case and may be used to withdraw carbon dioxide from the vessel 10 via a conduit 19 and deliver the same through a conduit 20 to a storage facility 21 in the form of a vessel that may essentially duplicate the vessel 10 both structurally and functionally. Transfer of the carbon dioxide from the storage facility to a point of use is indicated by the flow line 22.

The carbon dioxide mass stored within the container 14 is in multi-phasic form comprising essentially an admixture of both liquid and solid carbon dioxide to provide a pumpable body of carbon dioxide slush. It will be understood, however, that gaseous carbon dioxide is also present because the mass is maintained at about its triple-point condition. Provision of carbon dioxide in the slush form may be accomplished in a variety of manners, as subsequently explained, and a satisfactory exemplary system is depicted in the drawing in simplified form.

Such system includes means for delivering an appropriate admixture of carbon dioxide liquid and solids to the container 14 from a suitable source of supply through a conduit 24. The liquid and solid (i.e., snow) carbon dioxide components are proportioned for delivery to the interior of the container 14 in the relative quantities providing the desired consistency; namely, a pumpable mass having as large a solids component as practicable so as to maximize the cold content or refrigeration capacity of the mass while at the same time enabling it to be pumped and otherwise processed generally as a liquid [the term "pumpable" being used in a general sense to include any means ordinarily employed to effect the movement of liquid-type materials from one location to another including pumps and similar mechanical devices, utilization of gravitational forces, and transfer media such as, in the present instance, a lower boiling point material (nitrogen, for example) acting against the carbon dioxide mass to propel the same].

The exemplary system shown in FIG. 1 further includes a liquid carbon dioxide plant, diagrammatically represented at 25, which for purposes hereof may be completely conventional and serves to convert into the liquid phase gaseous carbon dioxide delivered thereto from a standard source via a flow system 26. Liquid carbon dioxide as converted in the plant 25 from the gaseous phase is carried by a flow conduit 27 through an expansion valve 28 and into a separator 29. Both the expansion valve and separator are standard pieces of equipment, and the latter usually includes baffles therewithin and has a tangentially oriented inlet facilitating function of the separator as a means for expanding the liquid from a pipe or other confining structure into a larger chamber that permits ready separation of the liquid and solids from the gases that evolve during the expansion step.

A primary mixer 30 driven by an electric motor 31 may be located within the separator 29 and serves to mix the carbon dioxide solids and liquid therewithin to prevent stratification of these two phases which otherwise might occur. In the typifying system illustrated in FIG. 1, the admixture of carbon dioxide liquid and solids is withdrawn from the separator 29 via a flow conduit 32 that leads to a secondary mixer 33. The inlet of a pump 34 is connected with the mixer 33 to receive the output therefrom, and the pump delivers the carbon dioxide mass to the container 14 through the flow conduit 24 interconnecting the same. In the particular form of the invention being considered, the mixer 33 is an homogenizer effective to homogenize the admixture of carbon dioxide liquid and solids so as to cause the same to resist separation by settling action.

In this reference, it will be appreciated that the carbon dioxide mass is more readily processed when the admixture of liquid and solids is relatively uniform. However, the tendency of the admixture is to stratify unless the solids are kept in suspension by special treatment thereof. That is to say, the settling characteristic of any admixture is generally determined by the relationship of the weight of each particle to the density of the fluid in which it resides, and it is relatively accurate and conventional to consider such relationship in terms of particle size. In this reference, a settling slurry consisting essentially of solid particles residing in a liquid is accepted as being one in which the particles are about 0.010 of an inch or larger. Correspondingly, a non-settling slurry of this type is one in which the particle size is about 0.002 of an inch or less. Between these two sizes of 0.010 and 0.002 of an inch, whether the slurry is settling or non-settling depends upon several factors extraneous, to a great extent, from particle size. In any case, the particle size required to make any slurry or admixture of solids and liquid non-settling is readily determined in accordance with the laws of physical chemistry and by standard mathematical computations used for this purpose. Thus, the homogenizing mixer 33 can be employed to provide a particle size causing the admixture to be homogeneous and it is readily omitted should an homogenized admixture of carbon dioxide liquid and solids be unnecessary or undesirable.

It might be observed that in the absence of an homogenized or non-settling admixture, some stratification or settling of the solids will occur during prolonged storage either within the vessel 10 or the storage facility 21. Should this result be unacceptable, it will be apparent that various mixing arrangements may be incorporated within any such vessel or facility so as to prevent stratification, and such mixing arrangements may include mechanical mixers such as the mixer 30 heretofore noted and recirculation-type mixers in which portions of the material are withdrawn from the storage vessel at one location and returned thereto at another location. In this latter reference, for example, quantities of the carbon dioxide liquid might be withdrawn from the container adjacent the surface level of the liquid therewithin, and such quantities returned to the container through a discharge manifold (such as an elongated tube having spaced apart discharged ports therealong) located along the bottom of the vessel in the general area at which the solids tend to collect.

Carbon dioxide gas evolved in the expansion of the liquid into the separator 29 is returned to the plant 25 for reprocessing therein via a flow conduit 35. The materials flowing through the conduits 27 and 35 are arranged to flow in heat exchange relation with each other through a heat exchanger 36 so that the heat present in the gaseous flow through the conduit 35 is used to decrease the temperature of the liquid carbon dioxide flow through the conduit 27. A flow control valve 37 is located along the conduit 35 so as to control the volume of gas returned therethrough to the plant 25 which, in turn, controls the quantity of carbon dioxide solids converted from the liquid carbon dioxide expanded into the separator 29.

That is to say, if less gaseous carbon dioxide is permitted to return to the plant 25 through the valve 37, the quantity of liquid carbon dioxide converted into solids within the separator 29 is reduced, and vice versa. Accordingly, the ratio of carbon dioxide solids to liquid leaving the separator 29 via the conduit 32 is determined by the adjustment of the control valve 37. Regulation of the control valve 37 may be made automatic by a feedback control loop 38 having a flow controller 39 located therealong. As shown in FIG. 1, the feedback control loop interconnects the valve 37 (which may be a solonoid-controlled valve) and the mixer 30 and motor 31 thereof. As the concentration of solids within the separator 29 increases, the load on the mixer 30 and motor 31 thereof increase and vice versa. Therefore, the flow controller 39 may be set manually for a particular torque development at the motor 31 representing an admixture of predetermine proportions, and when the consistency of such admixture increases, the flow controller 39 and feedback loop 38 functions to close the valve 37 slightly to reduce the quantity of solids developed within the separator 29. Conversely, should the motor torque decrease, thereby representing a reduction in the consistency of the carbon dioxide mass within the separator 29, the feedback control loop functions to open the valve 37 slightly so that a greater proportion of carbon dioxide liquid is converted into solids within the separator.

Also as concerns maintenance of the proper ratio of carbon dioxide liquid and solids, it is generally necessary to remove vapor from the container 14 as it is filled because there will be some conversion of carbon dioxide slush into vapor as the container is filled. The vapor is necessarily removed to prevent the ratio of carbon dioxide solids to liquid from greatly changing during the filling operation since the desired ratio has been previously determined and provided by operation of the heretofore described control means. Accordingly, the container 14 may be vented in any suitable and conventional manner as, for example, through a pressure relief valve, or the removed vapor may be returned to the plant 25 through a controlled return system analogous to that previously explained with reference to the separator 29.

As heretofore noted, the separator 29 has sufficient size to permit ready separation of carbon dioxide gas from the liquid and solids collecting therewithin; and the primary mixer 30 is incorporated into the separator 29 to effect a reasonably uniform admixture leaving the same through the conduit 32. The primary mixer can be located elsewhere, however, and it can also be of a type that reduces the particle size of the carbon dioxide solids sufficiently to enable the same to be maintained in suspension for relatively long periods and, if desired, reduced sufficiently in size such that the mass is homogenized within the separator. On the other hand, and as previously stated, the particle size of the carbon dioxide solids within the separator 29 and function of the mixer 30 therewithin may be to provide a settling type slurry or admixture, and the mass reprocessed, if desired, at a later stage in the secondary mixer 33 which may further reduce the particle size to increase the settling time of the admixture or to homogenize the same.

Conversion of carbon dioxide into the multi-phasic slush form described may be accomplished by a variety of other techniques including the direct admixture of carbon dioxide liquid and carbon dioxide snow within the container 14, the liquid and snow being supplied thereto from separate sources, as shown in FIG. 3 in which liquid and solid carbon dioxide components are supplied from separate plants 25' and 29' respectively, and delivered to the container 14. Also, the admixture can be attained by reducing the pressure of carbon dioxide liquid, in a manner somewhat analogous to the arrangement shown in FIG. 1, to cause crystals or carbon dioxide snow to form and be delivered to the container 14 with the process being continued until the desired liquid-to-solids ratio is attained, adequate quantities of carbon dioxide liquid being added to the container 14 as required. Further, quantities of liquid carbon dioxide can be formed within a cooling chamber provided for this purpose with the crystals or snow condensing along the surfaces of the chamber being scraped therefrom and delivered by a screw conveyor or otherwise to the filling pipe of the container 14. In any case, the desired liquid-to-solids ratio for the slush within the container 14 is readily obtainable.

The refrigeration capacity of carbon dioxide at its triple-point temperature and pressure is significantly greater in the solid than in the liquid phase by the ratio of approximately 234 BTU's per pound of solids to approximately 150 BTU's per pound by liquid, or about 1.56-to-1.0. Evidently, then, it is advantageous to provide within the container 14 the maximum practicable ratio of carbon dioxide solids to liquid limited, however, by that maximum ratio at which the composite mass can no longer be processed readily as a liquid. It will be appreciated that less than maximum solids-to-liquid ratios are readily accommodated and processed, but are not as desirable since they do not have the cold content or refrigeration capacity of the higher ratios. Within the range of suitable ratios, the liquid-solids admixture is generally referred to herein as "slush" as previously indicated, and a typical example of a satisfactory ratio is about 50 percent solids to 50 percent liquid on a volume basis.

As a more explicit typifying example, the following may be considered: liquid carbon dioxide having a pressure exceeding that of the triple-point pressure condition is expanded to the triple-point pressure while withdrawing a sufficient quantity of the carbon dioxide vapor evolved during such expansion to convert the desired proportion of liquid into solids or snow. Considering this procedure in numeric terms in which 100 pounds of carbon dioxide slush is formed with 50 percent by volume of 56.22 percent by weight constituting solids, approximately 153.14 pounds of saturated liquid carbon dioxide at 200 psia and $-24°$ F is expanded to the triple-point pressure. During such expansion, 53.14 pounds of carbon dioxide vapor at 75.1 psia and $-69.9°$ F is removed together with any additional quantity of vapor required to compensate for heat leak and any heat of mixing.

Should the ratio of solids-to-liquid for any particular application be either too great or too small, the amount of vapor withdrawn during the expansion is either reduced or increased, respectively, to change the ratio to that desired. The withdrawn vapor may be returned to the plant for recondensing, and the carbon dioxide mass can be mixed or homogenized, as desired, to keep the solids adequately suspended for convenient handling of the product.

Further considering the quantity of energy available in carbon dioxide for use thereof as an effective refrigerant, the relative refrigeration capacities of various admixtures of carbon dioxide liquid and solids at triple-point temperature and pressure conditions are evidenced in the following table:

| Carbon Dioxide Product (percent by weight) | | | Refrigeration Capacity (BTU's per pound of product) |
|---|---|---|---|
| Total | Solids | Liquid | |
| 100 | 0 | 100 | 150 |
| 100 | 25 | 75 | 171 |
| 100 | 50 | 50 | 192 |
| 100 | 75 | 25 | 213 |
| 100 | 100 | 0 | 234 |

Each of these enumerated refrigeration capacities exceeds and therefore can be favorably referenced to the present standard of only 117 BTU's per pound for saturated liquid carbon dioxide at a pressure of 300 psia as it is now transported and stored. Therefore, even in the case in which all of the solids component in any mass of carbon dioxide slush has been converted into liquid by a gradual increase in its heat content, at triple-point conditions the refrigeration capacity of the resultant liquid mass is still greater than that of the usual mass of high-pressure, saturated-liquid carbon dioxide on a pound-for-pound basis.

Moreover, the permissible storage or holding time for carbon dioxide without the provision of mechanical refrigeration equipment to maintain its heat content below that at which product loss occurs is very substantially enhanced by initially providing the carbon dioxide as a slush or liquid-solids admixture at triple-point conditions. This is clearly evidenced in the following table which compares the holding times without refrigeration before product loss commences for various carbon dioxide products stored at triple-point conditions in insulated vessels having the same heat leak:

| Carbon Dioxide Product (percent by weight) | | | Holding Time (in days) |
|---|---|---|---|
| Total | Solids | Liquid | |
| 100 | 0 | 100 | 4.3 |
| 100 | 25 | 75 | 40.0 |
| 100 | 50 | 50 | 74.0 |
| 100 | 75 | 25 | 108.0 |

Except for the carbon dioxide product existing entirely (for essentially) as a liquid at triple-point conditions, each of these storage times exceeds and therefore compares very favorably with a holding time of 27.0 days for saturated liquid carbon dioxide at a pressure in the approximate range of about 200 psia to 300 psia but otherwise stored under the same heat leak and other conditions.

This tremendous increase in the permissible holding time for carbon dioxide slush (i.e., liquid-solids admixtures at triple-point conditions) relative to the holding time of carbon dioxide stored as a saturated liquid at the much higher pressures now required is of great important because carbon dioxide is a perishable commodity the value of which varies inversely with the amount of heat absorbed thereby until the working pressure of the storage vessel has been reached at which time either produce loss must be permitted to occur or heat must be removed from the product by use of mechanical refrigeration equipment. Either alternative is undesirable because it is costly, the first as a consequence of the reduced quantity of carbon dioxide then available for use, and the second as a consequence both of the operating expense of the refrigeration system required to extract heat from the carbon dioxide and the initial costs of such system and general structural complexities necessitated thereby.

In using carbon dioxide as a refrigerant or medium for refrigeration purposes, it is frequently necessary to convert the transported product at its destination into "dry ice" pellets or solids, and the quantities of product that can be converted by depressurization to one atmosphere, without recompression, for various admixtures of carbon dioxide liquid and solids at triple-point temperature and pressure conditions are given in the following table:

| Carbon Dioxide Product (percent by weight) | | | Solids Yield in Percent (depressurization to one atmosphere) |
|---|---|---|---|
| Total | Solids | Liquid | |
| 100 | 0 | 100 | 60.1 |
| 100 | 25 | 75 | 68.6 |
| 100 | 50 | 50 | 77.0 |
| 100 | 75 | 25 | 85.5 |
| 100 | 100 | 0 | 93.9 |

Each of these yields exceeds and therefore compares favorably with a conversion into solids of only 47.0 percent under like conditions for saturated liquid carbon dioxide at a pressure of 300 psia as it is now transported.

The tremendous increase in refrigeration capacity per pound of carbon dioxide product in slush form is also accompanied by a significant increase both in the storage capacity of any conventional carbon dioxide vessel of fixed volume and in the capacity of a transport vehicle designed to accommodate carbon dioxide in slush form.

Respecting storage capacity, because the working pressure of a vessel containing carbon dioxide slush can be about one fourth that of vessels containing saturated carbon dioxide liquid (approximately 75 psia versus 300 psia), the consequent reduction in the working pressure for any conventional vessel of given size enables the same to be filled with about 13.5 percent more carbon dioxide slush by weight than high-pressure saturated carbon dioxide liquid. Accordingly, such increase in storage capacity reduces distribution costs for carbon dioxide used as a refrigeration medium by decreasing the refill frequency of the storage vessels.

Respecting transportation capacity, again because the working pressure of a vessel containing carbon dioxide slush can be about one fourth that of vessels containing high-pressure saturated carbon dioxide liquid, the storage container 14 can be constructed of much thinner material than heretofore possible, thereby reducing the weight of this component of the vessel by approximately 75 percent. Such weight reduction increases the permissible payload weight for highway (and other) vehicles by amounts of the order of 30 to 40 percent without, for example, exceeding the axle weight limitations imposed by most governmental agencies on highway vehicles.

The overall carbon dioxide distribution system represented in FIG. 1 includes (after production of carbon dioxide gas and formation thereof into a liquid, all in accordance with standard practice), converting a mass of carbon dioxide into a multi-phasic liquid-solids admixture and confining the same within the container 14 as a pumpable body of carbon dioxide slush. The vessel 10 is transportable which enables the slush to be moved from one location to another, and such movement of the slush may be, for example, from the site of a bulk terminal at which carbon dioxide is supplied as a liquid and is converted into slush to a destination of ultimate use. In the latter instance, the vessel 10 may be retained at the location of use and serve thereat as a stationary storage vessel, although the vessel may be unloaded into stationary storage containers (which may be at different locations respectively supplied by independent users) provided for this purpose, as shown in FIG. 1. In this Figure, the storage facility 21 may be taken to represent either a stationary storage facility at an intermediate holding destination or a stationary storage facility at a destination of ultimate use; and for purposes hereof it may even be viewed as representing the ultimate use for the carbon dioxide.

The method of distribution being considered is compatible with carbon dioxide distribution systems now in existence which are designed to handle carbon dioxide as a high pressure liquid. Therefore, the same transport vehicles, storage facilities, and filling and discharge networks including the safety features and provisions required by various regulatory agencies can all be used with very slight modification, such as change of the safety valves to limit the working pressure of the system and components thereof to the lower value generally useful for carbon dioxide slush. New equipment, however, intended for the distribution method disclosed can be of lesser structural strength since the exceedingly high working pressures heretofore necessary are not required. This is especially advantageous as respects transportable vessels which may be of significantly less weight, thereby substantially increasing the payload-to-gross weight ratio, as previously explained.

Other advantages of the subject distribution system, also as previously explained, include the tremendous increase in refrigeration capacity of the slush, the longer term permissible storage without refrigeration, increase in the specific volume of the slush product and correspondingly greater storage capacity of existing equipment, lighter permissible weight of transportation equipment and increased payload capacity thereof, elimination or reduction in the requirement for product refrigeration and in the consequent requirement for refrigeration equipment and maintenance thereof, and the lower capital investment necessary for lesser-strength equipment designed to handle carbon dioxide slush.

The ullage space within container 14 will normally be filled with gaseous carbon dioxide, and when additional carbon dioxide gas is used as a transfer medium to elevate the pressure within the container to discharge the slush therefrom, the surface liquid will be warmed up the absorption of some of the transfer gas to develop a matching vapor pressure, thus losing some of the refrigeration capacity of the slush product. Alternatively, a gas of lower boiling point than carbon dioxide such as nitrogen can be used to transfer the slush with substantially less loss of refrigeration capacity.

It may also be noted that mixing of the carbon dioxide liquid and solids may be accomplished by mechanical displacements of any receptacle containing the same, which, therefore, will agitate the mass, and a common agitator of this general type is a vibrator located, for example, within the separator 29. Further, although the invention is especially applicable to the use of carbon dioxide as a refrigerant, it also has utility in the storage and transportation of carbon dioxide used in the carbonated beverage industry because it enables larger quantities of carbon dioxide to be stored and transported within a container of any specific volume as a result of the increased density of carbon dioxide slush relative to saturated liquid carbon dioxide, and also as a result of the reduced tareweight of the thinner-walled container which may be used effectively for transporting the slush.

In the absence of an homogenized carbon dioxide mass within the container 14, any concentration of the settling solids at the bottom thereof from what otherwise would be a pumpable mass may be overcome for mixing and pumping purposes by injecting a liquid thereinto, as previously explained, to reconstitute, or initiate reconstitution of, the mass as a pumpable body.

Respecting expansion of carbon dioxide liquid into a space with the consequent collection of snow along the walls thereof which must be scraped or otherwise removed therefrom, the scraping devices may be so controlled and selected as to provide particles of a size sufficiently small to inhibit rapid settling, as heretofore explained. Similarly, any direct mixing of carbon dioxide solids or pellets with liquid to provide the desired consistency may be accompanied by mixing of a type to reduce the size of the pellets to inhibit rapid settling.

As used herein, the word "slush" describes the pumpable carbon dioxide admixture of solids and liquid generally at or near the triple-point temperature and pressure conditions. In certain instances it may be practically desirable to introduce a solvent such as acetone into the carbon dioxide liquid to permit operating at a temperature below the triple-point temperature of carbon dioxide in which case a slush of the solution with solid carbon dioxide can be processed as a pumpable fluid or mass below the triple-point temperature. Whereas the term "slush" as commonly used might be restricted to defining a slurry in which the solids are a frozen form of the liquid in which they are suspended, it is used herein in a generic sense to comprise slurries generally including the solvent-type solution noted.

While in the foregoing specification an embodiment of the invention has been set forth in considerable detail for purpose of making a complete disclosure thereof, it will be apparent to those skilled in the art that numerous changes may be made in such details without departing from the spirit and principles of the invention.

What is claimed is:

1. In a method of distributing carbon dioxide for use thereof as a refrigerant, the steps of: providing a mass of substantially pure carbon dioxide liquid and particulate carbon dioxide solids dispersed therein; confining said mass within a container therefor at a consistency defining a pumpable body, whereby said body can be removed from said container in the manner of a flowable liquid; and maintaining said mass in confinement at temperature and pressure conditions existing generally along the solid-liquid interface of the carbon dioxide equilibrium curve.

2. The method of claim 1 in which the confinement of said mass comprises confining the same at substantially the triple-point temperature and pressure conditions of carbon dioxide, and maintaining the mass thereat.

3. The method of claim 1 in which the further steps are included of transporting said container from the location at which said mass is confined therein to a destination remote therefrom, and discharging the mass from said container at such destination; the steps of confining, transporting, and discharging said mass comprising maintaining the same essentially at triple-point temperature and pressure conditions for carbon dioxide.

4. The method of claim 1 in which the step of providing a mass of carbon dioxide in the liquid-solid multi-phasic form includes mixing carbon dioxide solids with carbon dioxide liquid to provide an admixture thereof.

5. The method of claim 4 in which the step of combining carbon dioxide solids with carbon dioxide liquid comprises expanding relatively high pressure carbon dioxide liquid to a lower solids-forming pressure to convert at least a portion of such high pressure liquid into solids which are comprised in the aforesaid admixture.

6. The method of claim 5 in which the confinement and maintenance of said mass comprises confining and maintaining the same at substantially the triple-point temperature and pressure conditions of carbon dioxide; and in which the step of expanding carbon dioxide liquid to a lower pressure is continued until substantially the triple-point pressure is reached and then maintained.

7. The method of claim 1 in which the further step is included of mixing said carbon dioxide mass to facilitate processing thereof as a pumpable body.

8. The method of claim 1 in which the further step is included of homogenizing said carbon dioxide mass and forming an essentially non-settling body.

9. The method of claim 8 in which the further step is included of mixing said carbon dioxide mass prior to homogenizing the same.

10. In a method of producing and storing carbon dioxide in a multi-phasic form comprising an admixture of carbon dioxide liquid and particulate carbon dioxide solids dispersed therein, the steps of: expanding carbon dioxide liquid from a pressure exceeding that of the triple-point pressure theretoward to convert a portion of the liquid into solids and produce such multi-phasic admixture; withdrawing carbon dioxide vapor from the expansion zone to control the proportion of the liquid-to-solids conversion occurring therein to produce an admixture having a pumpable consistency; and delivering the resultant admixture as a pumpable mass to a storage container for confinement therein.

11. The method of claim 10 in which the step of expanding carbon dioxide liquid to a lower pressure is continued until substantially the triple-point pressure is reached; and in which the further step is included of confining the body of carbon dioxide within such storage container at substantially the triple-point temperature and pressure conditions.

12. The method of claim 10 in which the further step is included of mixing the carbon dioxide body prior to delivery thereof to such storage container to disperse the carbon dioxide solids within the liquid and facilitate processing of the carbon dioxide mass as a pumpable body.

13. The method of claim 12 in which the step of mixing the carbon dioxide prior to delivery thereof is continued to reduce the particle size of the solids to inhibit gravitational settling thereof so as to maintain the solids in suspension for relatively long periods.

14. The method of claim 13 in which the step of mixing the carbon dioxide mass essentially homogenizes the same to provide a substantially non-settling slurry.

15. The method of claim 12 in which the further step is included of homogenizing the carbon dioxide mass subsequent to mixing thereof to form an essentially non-settling body.

16. The method of claim 12 in which the step of expanding carbon dioxide liquid to a lower pressure is continued until substantially the triple-point pressure is reached; and in which the further step is included of confining and maintaining the body of carbon dioxide within such storage container at substantially the triple-point temperature and pressure conditions.

17. The method of claim 10 including the further step of regulatively adjusting the quantity of carbon dioxide vapor withdrawn from the expansion zone in response to the contemporary values of the consistency of the liquid-to-solids conversion occurring therein.

18. The method of claim 17 including the further step of mixing the carbon dioxide mass within the expansion zone, and sensing the resistance to mixing as the criterion for regulatively adjusting the withdrawal of carbon dioxide vapor as aforesaid.

19. Apparatus for producing and storing carbon dioxide in a multi-phasic form comprising an admixture of carbon dioxide liquid and particulate carbon dioxide solids dispersed therein, including: structure defining an expansion zone; means for expanding liquid carbon dioxide into said expansion zone from a pressure exceeding that of the triple-point pressure theretoward to convert a portion of the liquid into solids and produce a multi-phasic admixture; means for regulatively withdrawing carbon dioxide vapor from said expansion zone to control the proportion of the liquid-to-solids conversion occurring therein to provide an admixture having the consistency of a pumpable mass; an insulated storage container; and pump means to displace the resultant admixture as a pumpable body from said expansion zone into said container for confinement therein.

20. The apparatus of claim 19 and further including a mixer located generally within said expansion zone to effect a reasonably uniform admixture of liquid and solids for discharge therefrom as a pumpable body.

21. The apparatus of claim 20 and further including a second mixer intermediate said expansion zone and insulated storage container and effective to reduce the particle size of the carbon dioxide solids so as to inhibit gravitational settling thereof and thereby maintain the particles in suspension for relatively long periods.

22. The apparatus of claim 21 in which said second mixer is an homogenizer.

23. The apparatus of claim 19 in which said structure defining an expansion zone comprises a separator, and in which said means for expanding liquid carbon dioxide comprises an expansion zone adapted to be connected with a source of liquid carbon dioxide and communicating with said expansion zone to control the expansion of liquid carbon dioxide thereinto.

24. The apparatus of claim 23 and further including a mixer located generally within said expansion zone to effect a reasonably uniform admixture of liquid and solids for discharge therefrom as a pumpable body.

25. The apparatus of claim 19 in which said means for withdrawing carbon dioxide vapor from said expansion zone comprises a control valve connected therewith and through which such vapor flows.

26. The apparatus of claim 25 and further including means responsive to the consistency of the carbon dioxide mass present within said expansion zone and connected with said control valve to regulatively adjust the same in accordance with the contemporary values of the consistency of such mass.

27. The apparatus of claim 26 and further including a mixer located generally within said expansion zone to effect a reasonably uniform admixture of liquid and solids for discharge therefrom as a pumpable body, said means responsive to the consistency of the mass within said expansion zone being connected with said mixer to sense the resistance to mixing experienced thereby as an index of the consistency of the carbon dioxide mass.

28. The method of claim 4 in which the step of combining carbon dioxide solids with carbon dioxide liquid comprises introducing carbon dioxide solids into carbon dioxide liquid supplied from separate sources.

29. Apparatus for producing and storing carbon dioxide in a multi-phasic form comprising an admixture of carbon dioxide liquid and particulate carbon dioxide solids dispersed therein, including: structure defining an expansion zone; means for expanding liquid carbon dioxide into said expansion zone from a pressure exceeding that of the triple-point pressure theretoward to convert a portion of the liquid into solids and produce a multi-phasic admixture; means for regulatively withdrawing carbon dioxide vapor from said expansion zone to control the proportion of the liquid-to-solids conversion occurring therein to provide an admixture having the consistency of a pumpable mass; a mixer located generally within said expansion zone to mix solids within the liquid; and pump means to displace the resultant admixture as a pumpable body from said expansion zone into a container for confinement therein.

* * * * *